United States Patent [19]
Kage et al.

[11] Patent Number: 4,823,150
[45] Date of Patent: Apr. 18, 1989

[54] METHOD OF AND APPARATUS FOR PRINTING EDGES OF FLEXIBLE SHEETS IN ASSEMBLED RELATIONSHIP

[75] Inventors: Hermann J. Kage; Don E. Detterman; Wade A. Eden; Alex B. Chapman, all of Willard, Ohio

[73] Assignee: R. R. Donnelley & Sons Company, Lisle, Ill.

[21] Appl. No.: 151,871

[22] Filed: Feb. 3, 1988

[51] Int. Cl.[4] .............................................. G01D 15/00
[52] U.S. Cl. ....................................... 346/146; 283/42
[58] Field of Search ..................... 400/126, 16, 17, 62, 400/61, 128; 101/35, 1, 426, 4, 93.04, 93.08; 346/154, 75, 14 R, 159, 146, 1.1, 140 R, 140 A; 283/38, 40–43

[56] References Cited

U.S. PATENT DOCUMENTS

| | | | |
|---|---|---|---|
| 1,390,623 | 9/1921 | Kuehn | 283/42 |
| 2,359,328 | 10/1944 | Oppenheimer | 283/42 |
| 2,369,173 | 2/1945 | Oppenheimer | 283/42 |
| 3,774,228 | 11/1973 | Nielson | 346/146 |
| 3,911,818 | 10/1975 | MacIlvaine | 101/426 |
| 4,121,818 | 10/1978 | Riley et al. | 270/54 |
| 4,355,824 | 10/1982 | Weber et al. | 283/42 |
| 4,371,878 | 2/1983 | Jinnai | 346/146 |
| 4,427,290 | 1/1984 | Kaye et al. | 101/426 |

OTHER PUBLICATIONS

Muller Martini Limited Literature, Sep. 1983.

*Primary Examiner*—Arthur G. Evans
*Attorney, Agent, or Firm*—Wood, Dalton, Phillips, Mason & Rowe

[57] ABSTRACT

A method of and apparatus for printing on corresponding edges of a plurality of flexible sheets maintained in assembled relationship are disclosed. The method includes the steps of printing on the edges of non-contact fashion, controlling the printing with a font programmable to represent indicia to be printed on the edges, dividing the edges into a grid defined by a network of evenly distributed horizontal and vertical spaces, selecting a position on the edges for printing the indicia, indentifying the spaces on the grid for receive portions of the indicia to be printed thereon, determining the portions of the indicia to be printed in each of the spaces in the grid so identified, and programming the font to cause the printing means to print the portions of the indicia so determined in the spaces of the grid so identified after the position for printing of the indicia has been selected. The apparatus includes a printer for printing on the edges in non-contact fashion, a controller including a font programmable to represent indicia to be printed on the edges, a device placing the edges in operative relation to the printer to accommodate printing of the indicia in a selected position on the edges, the edges being divided into a grid defined by a network of evenly distributed horizontal and vertical spaces.

25 Claims, 3 Drawing Sheets

METHOD OF AND APPARATUS FOR PRINTING EDGES OF FLEXIBLE SHEETS IN ASSEMBLED RELATIONSHIP

DESCRIPTION

1. Field Of The Invention

Generally, the present invention is related to methods of and apparatus for printing and, more particularly, to a method of and apparatus for printing on corresponding edges of a plurality of flexible sheets.

2. Background of the Invention

At this point in time, the field of printing has been in existence for many years and is generally recognized as a relatively well developed technology. Nevertheless, even in recent years, there have been significant advances and a wide variety of printing related developments.

For instance, among the more significant of recent developments is ink jet printing which is, in contrast to earlier methods or technologies, a non-contact or non-impact type of printing. Ink jet printing is now developed to the extent that computer controlled printing presses are available whereby variable message data as well as fixed data can be imprinted on paper at press speeds. However, while widely recognized as a development of significant import, it is believed by many that still more diverse applications will be forthcoming for ink jet printing.

In an allied field of technology, there have been diverse proposals for providing indexing for books and the like. For instance, Kuehn U.S. Pat. No. 1,390,623 suggests providing an index on a book such as a dictionary by cutting or etching the letters so as to be recessed with respect to the edges of the pages. Also, Oppenheimer U.S. Pat. No. 2,369,173 suggests contact printing of indicia on the fore-edge of a book which is plainly visible only when the book is flexed by bending about an axis parallel to the indexed surface Further, Oppenheimer U.S. Pat. No. 2,359,328 suggests mutilating the inclined edges of a book to an extent sufficient for substantially the entire portion of the edges to be printed to receive ink when a printing tool is pressed thereon. Still further, Kaye et al U.S. Pat. No. 4,427,290 suggests providing successive raster lines of title information which are scanned onto the edges of a serially produced collated copy during reproduction. However, all of these attempts to provide indicia on the corresponding edges of flexible sheets are less than entirely satisfactory for all purposes.

For instance, in the case of dictionaries, some indexing is labor intensive and thus quite expensive for commercial applications. Similarly, any form of contact printing known today which is applicable to the fore-edge of a book or the corresponding edges of any plurality of flexible sheets is not only slow but also requires very expensive machinery as well as the generation of a separate mat for each new application and also is not satisfactory for printing where the edge is curved. Despite these problems, and the known existence of ink jet printing, there have been no known attempts to utilize ink jet printing on the edges of a book or the like.

The present invention is directed to overcoming the above stated problems and accomplishing the stated objects in a unique manner.

SUMMARY OF THE INVENTION

Accordingly, the present invention is directed to a method of printing on corresponding edges of a plurality of flexible sheets maintained in assembled relationship. The method includes the steps of providing means for printing on the edges of the flexible sheets in non-contact fashion and providing means for controlling the printing means including a font programmable to represent indicia to be printed on the edges of the flexible sheets where the controlling means is operatively associated with the printing means. The method also includes the step of dividing the edges of the flexible sheets into a grid defined by a network of evenly distributed horizontal and vertical spaces. The method further includes the steps of selecting a position on the edges of the flexible sheets for printing the indicia, identifying the spaces in the grid to receive portions of the indicia to be printed thereon, and determining the portions of the indicia to be printed in each of the spaces in the grid so identified. Furthermore, the method includes the step of programming the font to cause the printing means to print the portions of the indicia so determined in the spaces of the grid so identified after the position for printing of the indicia has been selected.

Further details of the method include the printing means taking the form of an ink jet printer having at least one print bar extending transversely of the corresponding edges of the flexible sheets in a plane generally parallel thereto. It is also contemplated that the network of evenly distributed horizontal and vertical spaces defining the grid are "em" spaces each of which is identified as to horizontal and vertical location by a different machine-intelligible designation. Additionally, the method includes the steps of imparting relative movement between the printing means and the corresponding edges of the flexible sheets and compressing the flexible sheets to cause each of the corresponding edges to be in contact with the next adjacent of the corresponding edges as the font causes the printing means to print the portions of the indicia.

Moreover, the present invention is directed to an apparatus for printing on corresponding edges of a plurality of flexible sheets maintained in assembled relationship. The apparatus includes means for printing on the edges of the flexible sheets in non-contact fashion and means for controlling the printing means including a font programmable to represent indicia to be printed on the edges of the flexible sheets which is operatively associated with the printing means. The apparatus also includes means for placing the edges of the flexible sheets in operative relation to the printing means and the placing means is adapted to accommodate printing of the indicia in a selected position on the edges. With the edges of the flexible sheets being divided into a grid defined by a network of evenly distributed horizontal and vertical spaces, the font is programmable to cause the printing means to print determined portions of the indicia in identified ones of the spaces in the grid after the position has been selected.

In the preferred embodiment, the printing means takes the form of an ink jet printer having at least one print bar extending transversely of the corresponding edges of the flexible sheets in a plane generally parallel thereto. As in the method, the network of evenly distributed horizontal and vertical spaces defining the grid are "em" spaces each of which is identified as to horizontal and vertical location by a different machine-intelligible designation. Also, as with the method, the placing means is adapted to impart relative movement between the printing means and the corresponding edges of the flexible sheets and is also adapted to compress the flexible sheets as the font causes the printing means to print the portions of the indicia.

In an exemplary embodiment, the flexible sheets maintained in assembled relationship comprises a book. The corresponding edges of the plurality of flexible sheets then preferably comprise a fore-edge of the book or, alternatively, some other edge thereof. In this application, the placing means causes the fore-edge to be placed in operative relation to the ink jet printer.

More specifically, the placing means preferably includes a conveyor for delivering a continuous supply of books to the ink jet printer and also includes a compression device adapted to receive and compress each of the books as the font causes the ink jet printer to print the portions of the indicia. The controlling means advantageously includes means for sensing the arrival of the books at a preselected location upstream of the ink jet printer, and the sensing means is preferably operatively associated with the ink jet printer to cause the indicia to be printed in the selected position on the fore-edges of the books. With this construction, the conveyor is adapted to deliver the continuous supply of books to the ink jet printer in a generally vertical upright orientation and the ink jet printer includes an arm supporting the print bar over the conveyor in confronting relation to the upwardly facing fore-edges of the books.

Still additional details of the apparatus include the compression device having a plurality of spring biased arms disposed on opposite sides of a path of travel for the books and also having an endless driven belt disposed over the spring biased arms on each side of the path of travel for the books. The spring biased arms are preferably provided as pairs disposed in confronting relation on opposite sides of the path of travel for the books. Additionally, the compression device is advantageously adjustable to accommodate books of differing sizes and to vary the compression provided thereby, and the endless driven belts are disposed in confronting relation to engage and compress opposite sides of the books.

In accordance with another aspect of the invention, a plurality of flexible sheets maintained in assembled relationship and having printing on corresponding edges of the flexible sheets is provided. This is accomplished by dividing the edges of the flexible sheets into a grid defined by a network of evenly distributed horizontal and vertical spaces. Also, it is accomplished by selecting a position on the edges of the flexible sheets for printing the indicia, identifying the spaces in the grid to receive portions of the indicia to be printed thereon, and determining the portions of the indicia to be printed in each of the spaces in the grid so identified. This is also accomplished by printing on the edges of the flexible sheets in non-contact fashion and controlling the printing with a font programmable to represent indicia to be printed on the edges of the flexible sheets. For this arrangement, the font is programmed to cause the portions of the indicia so determined to be printed in the spaces of the grid so identified after the position for printing of the indicia has been selected.

Other objects, advantages and features of the present invention will become apparent from a consideration of the following description taken in conjunction with the accompanying drawings.

DETAILED DESCRIPTION OF THE PREFERRED EMBODIMENTS

Figure 1:
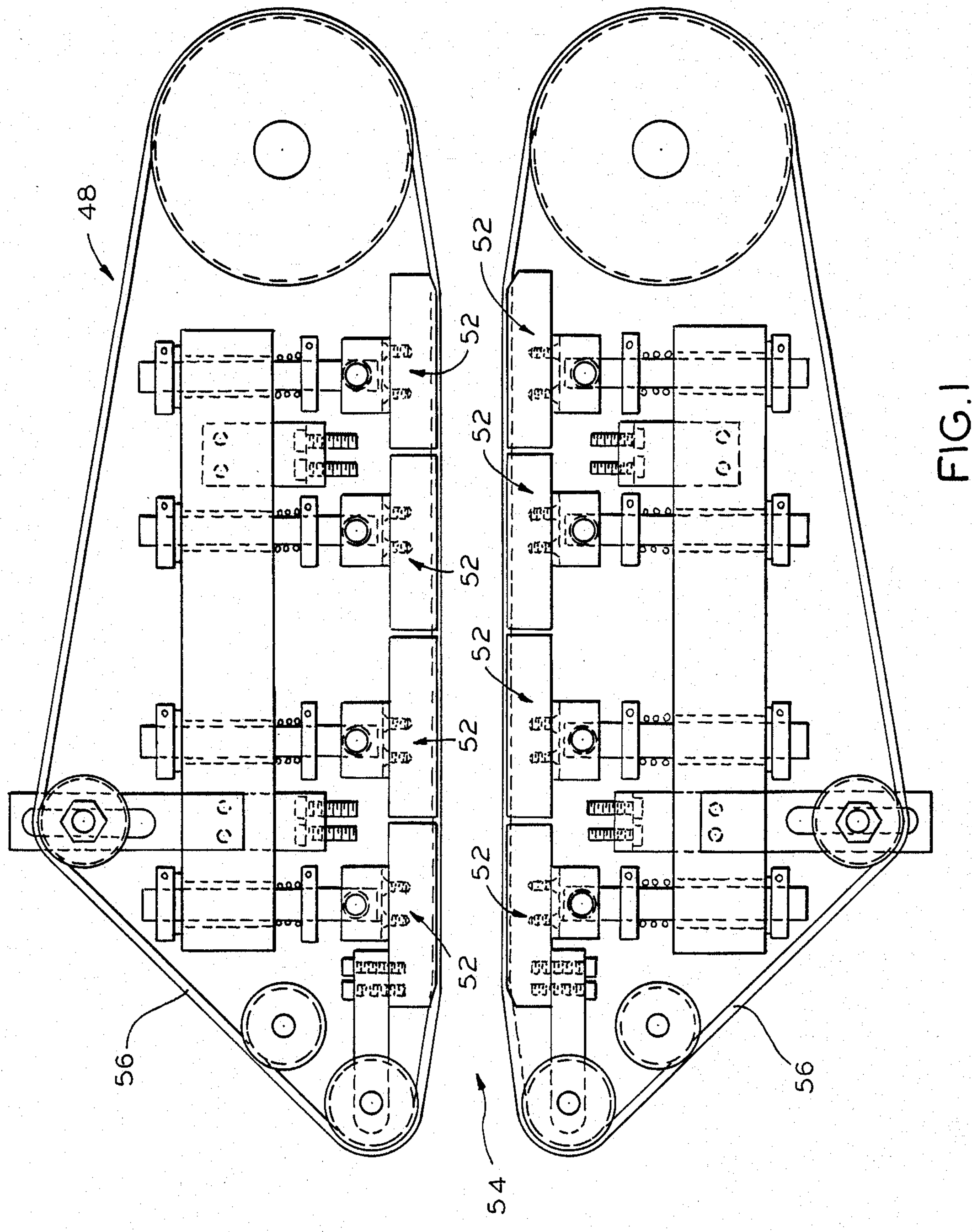
FIG. 1 is a top plan view of a compression device for the printing apparatus of the present invention.

An exemplary embodiment of an apparatus 20 for printing on corresponding edges 22 of a plurality of flexible sheets 24 (see FIG. 9) maintained in assembled relationship as most clearly illustrated in FIGS. 1 through 4. The printing apparatus 20 includes means generally designated 26 for printing on the edges 22 of the flexible sheets 24 in non-contact fashion and means generally designated 28 for controlling the printing means 26 comprising a font 29 programmable to represent indicia 30 (see FIG. 8) to be printed on the edges 22 of the flexible sheets 24 which is operatively associated with the printing means 26. The printing apparatus 20 also includes means generally designated 32 for placing the edges 22 of the flexible sheets 24 in operative relation to the printing means 26 so as to accommodate printing of the indicia 30 in a selected position on the edges 22 which are divided into a grid generally designated 34 (see FIG. 5) defined by a network of evenly distributed horizontal and vertical spaces 36. With this arrangement, the font 29 is programmable to cause the printing means 26 to print determined portions of the indicia 30 in identified ones of the spaces 36 in the grid 34 after the position has been selected.

Still referring to FIGS. 1–4, 5, 8 and 9, the printing means 26 preferably is an ink jet printer having at least one print bar 38 extending transversely of the corresponding edges 22 of the flexible sheets 24 in a plane generally parallel thereto. It is also preferred that the network of evenly distributed horizontal and vertical spaces 36 defining the grid 34 (see FIG. 5) are "em" spaces, each of which is identified as to horizontal and vertical location by a different machine-intelligible designation as at 40. Additionally, the placing means 32 is adapted to impart relative movement between the printing means or ink jet printer 26 and the corresponding edges 22 of the flexible sheets 24 and to compress the flexible sheets 24.

More particularly, the placing means 32 is adapted to comprise the flexible sheets 24 to cause each of the corresponding edges 22 to be in contact with the next adjacent of the corresponding edges 22 as the font 29 causes the printing means 26 to print the portions of the indicia 30.

Figure 8:
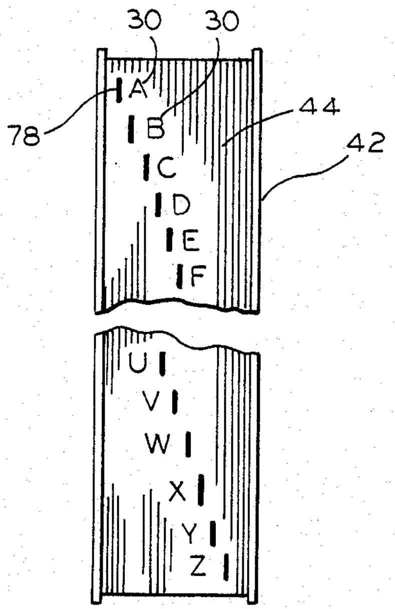
FIG. 8 is a front elevational view of a plurality of flexible sheets having printing on corresponding edges in accordance with the present invention.
Figure 9:
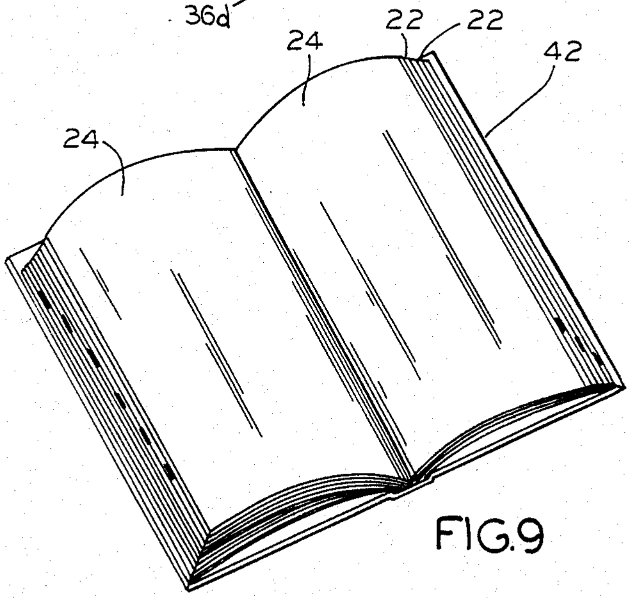
FIG. 9 is a perspective view of the flexible sheets of FIG. 8 having printing on corresponding edges in an opened position.

As will be appreciated, the flexible sheets 24 maintained in assembled relationship can comprise a book 42 (see FIGS. 8 and 9). It is also advantageous for the corresponding edges 22 of the plurality of flexible sheets 24 to comprise a fore-edge, generally designated 44, of the book 42 although any other edge thereof can also be printed in the manner described by the present invention. However, when the fore-edge 44 of the book 42 is to be printed, the placing means 32 causes the fore-edge 44 to be placed in operative relation to the ink jet printer 26 (see FIGS. 2 and 3).

In the preferred embodiment, the placing means 32 includes a conveyor 46 for delivering a continuous supply of the books 42 to the ink jet printer 26 and a compression device, generally designated 48, which is adapted to receive and compress each of the books 42 as the font 29 causes the ink jet printer 26 to print the portions of the indicia 30. The conveyor 46 is adapted to deliver the continuous supply of the books 42 to the ink jet printer 26 in a generally vertical upright orientation where the ink jet printer 26 includes an arm 50 carrying the print bar 38, which faces downwardly, the arm 50 extending over the conveyor 46 such that the downwardly facing print bar 38 is in confronting relation to the upwardly facing fore-edges 44 of the books 42. Referring specifically to FIG. 1, the compression device 48 includes a plurality of spring-biased arms 52 disposed on opposite sides of a path of travel 54 for the books and also includes an endless driven belt 56 disposed over the spring-biased arms 52 on each side of the path of travel 54 for the books 42.

Still referring to FIG. 1, the spring-biased arms 52 are provided as pairs disposed in confronting relation on opposite sides of the path of travel. The compression device 48 is adjustable to accommodate books of differing sizes and to vary the compression provided thereby, and the conveyor 46 is adapted to deliver the continuous supply of the books 42 to the ink jet printer 26 in a generally vertical upright orientation, as previously noted. Furthermore, the endless driven belts 56 are disposed in confronting relation (as shown in FIGS. 1–3) to engage and compress opposite sides 58 and 60 of the books 42.

Figure 2:
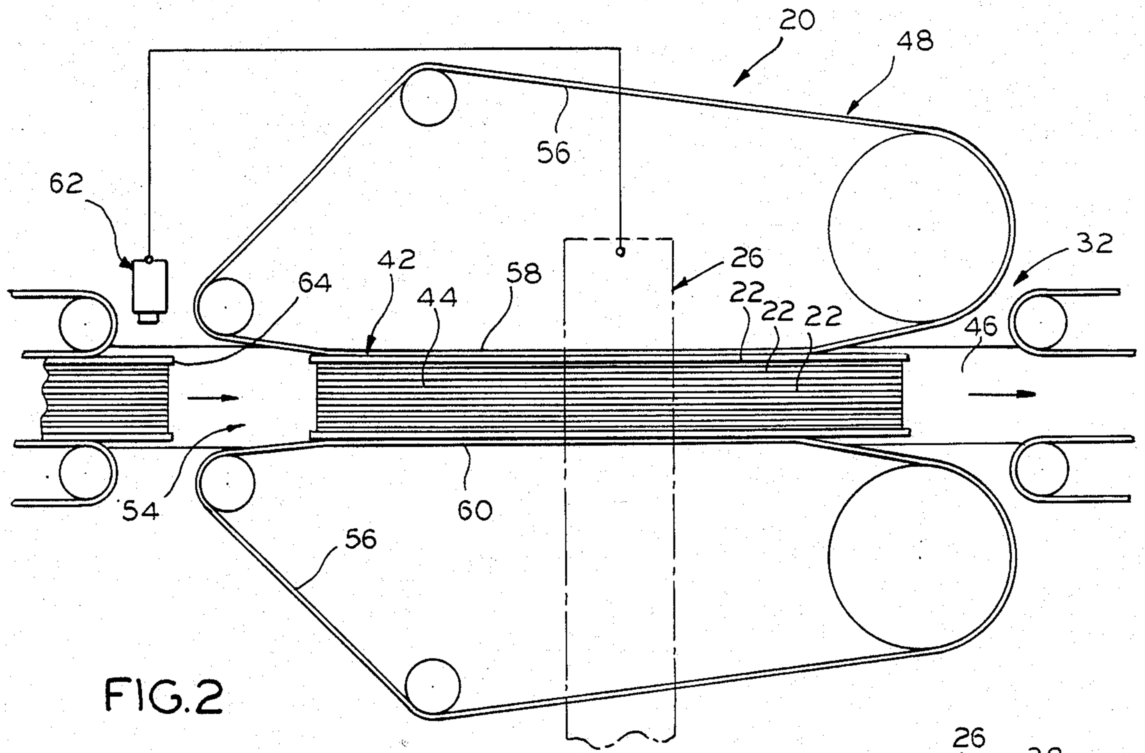
FIG. 2 is a top plan view, schematically illustrated, of the printing device of the present invention.
Figure 3:
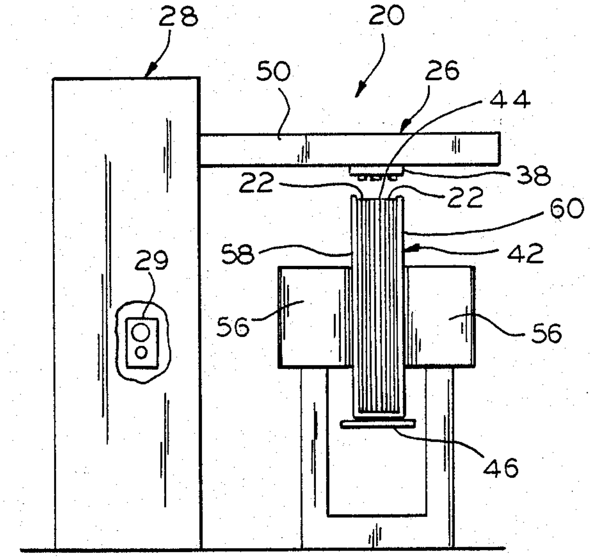
FIG. 3 is a front elevational view, schematically illustrated, of the printing apparatus of the present invention.

Referring specifically to FIG. 2, the controlling means 28 also preferably includes means 62 for sensing the arrival of the books 42 at a preselected location upstream of the ink jet printer 26. The sensing means 62, which can take the form of an optical sensor detecting the passage of the leading edge 64 of each of the books 42 or can comprise any other of a wide variety of known position sensing mechanisms, is operatively associated with the ink jet printer 26 to cause the indicia 30 to be printed in the selected position on the fore-edges 44 of the books 42. In this connection, the sensing means 62 will be coordinated by means of a timing circuit of a known type that is operatively associated with the operating speed of the conveyor 46.

Figure 4:
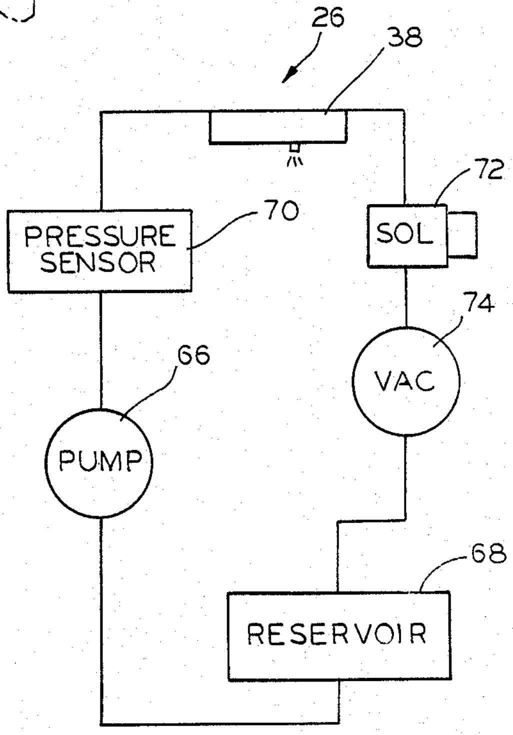
FIG. 4 is a diagram of an ink jet printer, schematically illustrated, for the printing apparatus of the present invention.
Figure 5:
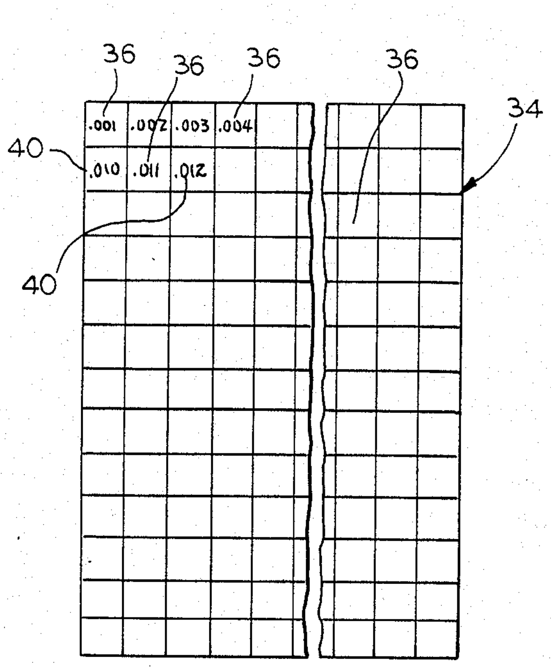
FIG. 5 is a diagram of a grid, schematically illustrated, for the printing method of the present invention.

Referring to FIG. 4, a schematic illustration of the ink jet printer 26 is fully disclosed and, in addition to the print bar 38, it will include a pump 66 disposed between the print bar 38 and an ink reservoir 68. There is also a pressure sensor 70 disposed between the pump 66 and the print bar 38 to control the pressure at the print bar 38 and, thus, the pump 66 is adapted to deliver ink from the reservoir 68 to the print bar 38 at a desired pressure for operation in accordance with the design specifications thereof. Also, as shown, the ink jet printer 26 includes a solenoid valve 72 and a source of vacuum 74 disposed between the print bar 38 and the ink reservoir 68 for purposes common to most commercial ink jet printers.

In addition to the printing apparatus 20 as described hereinabove, the present invention is directed to a method of printing on corresponding edges of a plurality of flexible sheets maintained in assembled relationship. The printing method comprises the steps of providing means 26 for printing on the edges 22 of the flexible sheets 24 in non-contact fashion and providing means 28 for controlling the printing means 26 including a font 29 programmable to represent indicia 30 to be printed on the edges 22 of the flexible sheets 24. The controlling means 28, in accordance with the method, is operatively associated with the printing means 26. The printing method also includes the steps of dividing the edges 22 of the flexible sheets 24 into a grid 34 defined by a network of evenly distributed horizontal and vertical spaces 36, selecting a position 76 on the edges 22 of the flexible sheets 24 for printing the indicia 30, identifying the spaces, such as 36*a–d*, in the grid 34 to receive portions, such as 30*a–d*, of the indicia 30 to be printed thereon, and determining the portions, such as 30*a–d*, of the indicia 30 to be printed in each of the spaces, such as 36*a–d*, in the grid 34 so identified. In addition, the printing method includes the step of programming the font 29 to cause the printing means 26 to print the portions, such as 30*a–d*, of the indicia 30 so determined in the spaces, such as 36*a–d*, of the grid 34 so identified after the position 76 for printing of the indicia 30 has been selected.

In accordance with the method, the printing means 26 is preferably an ink jet printer having at least one print bar 38 extending transversely of the corresponding edges 22 of the flexible sheets 24 in a plane generally parallel thereto. It is also advantageous for the network of evenly distributed horizontal and vertical spaces 36 defining the grid 34 to be "em" spaces each of which is identified as to horizontal and vertical location by a different machine-intelligible designation as at 40. Furthermore, the printing method preferably includes the steps of imparting relative movement between the printing means 26 and the corresponding edges 22 of the flexible sheets 24 as the font 29 causes the printing means 26 to print the portions, such as 30*a–d*, of the indicia 30.

In accordance with still another aspect of the present invention, a plurality of flexible sheets maintained in assembled relationship and having printing on corresponding edges of the flexible sheets is provided. This is accomplished by following the steps of dividing the edges of the flexible sheets into a grid defined by a network of evenly distributed horizontal and vertical spaces, selecting a position on the edges of the flexible sheets for the printing of indicia thereon, identifying the spaces in the grid to receive portions of the indicia to be printed thereon, and determining the portions of the indicia to be printed in each of the spaces in the grid so identified. It is also accomplished by following the steps of printing on the edges of the flexible sheets in non-contact fashion and controlling the printing with a font programmable to represent the indicia to be printed on the edges of the flexible sheets. Still additionally, the flexible sheets which have printing on corresponding edges are provided by programming the font to cause the portions of the indicia so determined to be printed in the spaces of the grid so identified after the position for printing of the indicia has been selected.

Generally, in ink jet letter printing, the letters must be printed in discrete lines which would otherwise make this type of printing unacceptable for indexing such as on dictionaries. However, in accordance with the present invention, the letters may be ink jet printed so as to extend diagonally of the fore-edge of a book (see FIG. 8).

In the printing method, a conveyor is used to feed the books to the printer on a continuous basis for printing on an edge thereof. The books are then passed through the compression device that controls the thickness and linear travel speed of the book. While the book is held and moved through the compression device, the ink jet printing is applied to, e.g., the fore-edge of the book.

In order to achieve this result, the font is capable of printing across two "em" spaces (the largest printing spaces). Thus, when the two "em" spaces are printed adjacent to each other, the complete letter can be printed. By combining two "em" spaces to generate one character, the character can be positioned anywhere within the first and second "em" space so as to achieve the overall diagonal printing of letters shown in FIG. 8.

Figure 6:
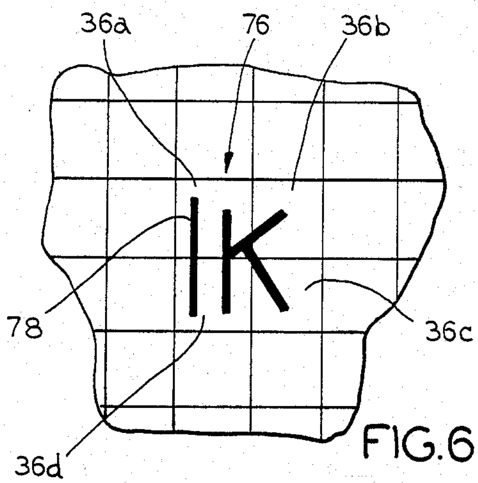
FIG. 6 is a partial diagram of a grid, bearing a bleed line and letter, for the printing method of the present invention.
Figure 7:
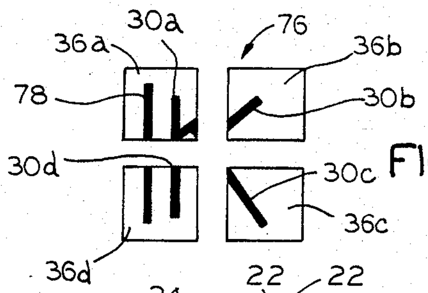
FIG. 7 is an exploded view of the portion of FIG. 6 bearing the bleed line and letter.

Moreover, by vertically positioning the letter location when programming the font, the character can actually be positioned anywhere within four "em" spaces. This permits maximum shifting of the horizontal and vertical position of the character as can be appreciated by referring to FIGS. 6 and 7. As will be appreciated by reason of the flexibility in positioning, the particular application being discussed has significant utility for dictionaries.

However, the principles of the present invention have much wider applicability than just dictionaries. It is technically feasible with the concepts of the present invention to design, for instance, a logo that would cover some or all of a fore-edge (or other edge) of a book (or other assembled flexible sheets) whereby not only indexing, but also advertising, decoration, personalization, and any other desired printed message or visual indicia can be applied in any desired position by ink jet printing. Accordingly, the present invention is not only effective but also highly versatile.

When used for indexing of books, it will be appreciated that the present invention can be utilized in several ways. First, it is simply possible to place the letter or other indexing indicia in the middle of the appropriate section of the book. Second, it is also possible to place the letter or other indexing indicia next to a tab or bleed line marking the beginning of that section. In this connection, the indicia 30 can be accurately positioned in accordance with the present invention next to the corresponding tab or bleed line 78 (see FIGS. 6–8 and 10).

Figure 10:
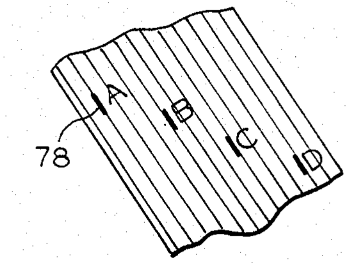
FIG. 10 is an enlarged detail view illustrating portions of FIG. 9.

As will be appreciated by referring to FIG. 10, the indicia 30 will expand or enlarge upon opening the book 42. This occurs because the indicia 30 is initially printed with the pages 24 compressed by means of the compression device 48. As a result, the indicia 30 will have an enlarged or expanded appearance when the book 42 is opened.

Among other possibilities for the present invention is printing the fore-edge (or other edge) of books either before or after they are in case. Either way, the placing means 32 is able to deliver books 42 to the ink jet printer 26 at speeds of up to 450 feet per minute or greater. At these speeds, the sensing means 62 controls the initial operation of the ink jet printer 26 which is thereafter controlled by the controlling means 28 all to within a tolerance of approximately 1/32 inch linearly.

Conventionally, print bars such as 38 are one inch in length. It is, therefore, possible to use multiple print bars in side-by-side relationship depending upon the width of the book or other flexible sheet assembly being printed. Of course, it is also equally possible to accomplish the same result with a single longer print bar.

While the book has been described herein as traveling while in a vertical orientation, this is not essential to practicing the invention. It is also possible that, other than books, the edges of square-backed magazines and catalogs, phone and other directories, and the like can also be printed utilizing the valuable benefits of the present invention. Moreover, the compression device is fully capable of permitting printing on any edge surface in the manner described in detail hereinabove.

Other alternatives in the present invention includes using optical detection of tabs or bleed lines for initiating printing. It is also possible to utilize solenoid control rather than spring biasing for the compression device to control the degree of compression of the book as it passes under the ink jet printer. Still further, horizontal and vertical positioning adjustment could be controlled with an image engine.

While in the foregoing there have been set forth preferred embodiments of the invention, it is to be understood that the invention is only to be limited by the spirit and scope of the appended claims.

We claim:

1. A method of printing on corresponding edges of a plurality of flexible sheets maintained in assembled relationship, comprising the steps of:
   - providing means for printing on said edges of said flexible sheets in non-contact fashion;
   - providing means for controlling said printing means, said controlling means comprising a font programmable to represent indicia to be printed on said edges of said flexible sheets, said controlling means being operatively associated with said printing means;
   - dividing said edges of said flexible sheets into a grid, said grid being defined by a network of evenly distributed horizontal and vertical spaces;
   - selecting a position on said edges of said flexible sheets for printing said indicia, identifying said spaces in said grid to receive portions of said indicia to be printed thereon, and determining said portions of said indicia to be printed in each of said spaces in said grid so identified; and
   - programming said font to cause said printing means to print said portions of said indicia so determined in said spaces of said grid so identified after said position for printing of said indicia has been selected.

2. The method of printing as defined by claim 1 wherein said printing means is an ink jet printer having at least one print bar extending transversely of said corresponding edges of said flexible sheets in a plane generally parallel thereto.

3. The method of printing as defined by claim 1 wherein said network of evenly distributed horizontal and vertical spaces defining said grid are "em" spaces, said "em" spaces each being identified as to horizontal and vertical location by a different machine-intelligible designation.

4. The method of printing as defined by claim 1 including the step of imparting relative movement between said printing means and said corresponding edges of said flexible sheets as said font causes said printing means to print said portions of said indicia.

5. The method of printing as defined by claim 1 including the step of compressing said flexible sheets to cause each of said corresponding edges to be in contact with the next adjacent of said corresponding edges as said font causes said printing means to print said portions of said indicia.

6. An apparatus for printing on corresponding edges of a plurality of flexible sheets maintained in assembled relationship, comprising:

means for printing on said edges of said flexible sheets in non-contact fashion;

means for controlling said printing means, said controlling means comprising a font programmable to represent indicia to be printed on said edges of said flexible sheets, said controlling means being operatively associated with said printing means; and means for placing said edges of said flexible sheets in operative relation to said printing means, said placing means being adapted to accommodate printing of said indicia in a selected position on said edges;

said edges of said flexible sheets being divided into a grid, said grid being defined by a network of evenly distributed horizontal and vertical spaces;

said font being programmable to cause said printing means to print determined portions of said indicia in identified ones of said spaces in said grid after said position has been selected.

7. The apparatus for printing as defined by claim 6 wherein said printing means is an ink jet printer having at least one print bar extending transversely of said corresponding edges of said flexible sheets in a plane generally parallel thereto.

8. The apparatus for printing as defined by claim 6 wherein said network of evenly distributed horizontal and vertical spaces defining said grid are "em" spaces, said "em" spaces each being identified as to horizontal and vertical location by a different machine-intelligible designation.

9. The apparatus for printing as defined by claim 6 wherein said placing means is adapted to impart relative movement between said printing means and said corresponding edges of said flexible sheets as said font causes said printing means to print said portions of said indicia.

10. The apparatus for printing as defined by claim 6 wherein said placing means is adapted to compress said flexible sheets to cause each of said corresponding edges to be in contact with the next adjacent of said corresponding edges as said font causes said printing means to print said portions of said indicia.

11. An apparatus for printing on corresponding edges of a plurality of flexible sheets maintained in assembled relationship, comprising:

an ink jet printer having at least one print bar extending transversely of said corresponding edges of said flexible sheets in a plane generally parallel thereto;

means for controlling said ink jet printer, said controlling means comprising a font programmable to represent indicia to be printed on said edges of said flexible sheets, said controlling means being operatively associated with said ink jet printer; and means for placing said edges of said flexible sheets in operative relation to said ink jet printer, said placing means being adapted to accommodate printing of said indicia in a selected position on said edges;

said placing means also being adapted to impart relative movement between said ink jet printer and said corresponding edges of said flexible sheets as said font causes said ink jet printer to print said portions of said indicia;

said placing means also be adapted to compress said flexible sheets to cause each of said corresponding edges to be in contact with the next adjacent of said corresponding edges as said font causes said ink jet printer to print said portions of said indicia;

said edges of said flexible sheets being divided into a grid, said grid being defined by a network of evenly distributed horizontal and vertical spaces;

said font being programmable to cause said ink jet printer to print determined portions of said indicia in identified ones of said spaces in said grid after said position has been selected.

12. The apparatus for printing as defined by claim 11 wherein said network of evenly distributed horizontal and vertical spaces defining said grid are "em" spaces, said "em" spaces each being identified as to horizontal and vertical location by a different machine-intelligible designation.

13. The apparatus for printing as defined by claim 11 wherein said flexible sheets maintained in assembled relationship comprise a book, said corresponding edges of said plurality of flexible sheets comprising a fore-edge of said book, said placing means causing said fore-edge to be placed in operative relation to said ink jet printer.

14. The apparatus for printing as defined by claim 13 wherein said placing means includes a conveyor for delivering a continuous supply of said books to said ink jet printer and a compression device adapted to receive and compress each of said books as said font causes said ink jet printer to print said portions of said indicia.

15. The apparatus for printing as defined by claim 13 wherein said controlling means includes means for sensing the arrival of said books at a preselected location upstream of said ink jet printer, said sensing means being operatively associated with said ink jet printer to cause said indicia to be printed in said selected position on said fore-edges of said books.

16. The apparatus for printing as defined by claim 14 wherein said conveyor is adapted to deliver said continuous supply of said books to said ink jet printer in a generally vertical upright orientation, and said ink jet printer includes an arm carrying said print bar and extending over said conveyor in confronting relation to said fore edges of said books.

17. The apparatus for printing as defined by claim 14 wherein said compression device includes a plurality of spring biased arms disposed on opposite sides of a path of travel for said books, said compression device also including an endless driven belt disposed over said spring biased arms on each side of said path of travel for said books.

18. The apparatus for printing as defined by claim 17 wherein said spring biased arms are provided as pairs disposed in confronting relation, said compression device being adjustable to accommodate books of differing sizes and to vary the compression provided thereby, said endless driven belts being disposed in confronting relation.

19. The apparatus for printing as defined by claim 17 wherein said conveyor is adapted to deliver said continuous supply of said books to said ink jet printer in a generally vertical upright orientation, said endless driven belts being disposed in confronting relation to engage and compress opposite sides of said books.

20. A plurality of flexible sheets maintained in assembled relationship and having printing on corresponding edges of said flexible sheets, where said edges are printed by following the steps of:

dividing said edges of said flexible sheets into a grid, said grid being defined by a network of evenly distributed horizontal and vertical spaces;

selecting a position on said edges of said flexible sheets for printing an indicia, identifying said spaces in said grid to receive portions of said indicia to be printed thereon, and determining said portions of said indicia to be printed in each of said spaces in said grid so identified;

printing on said edges of said flexible sheets in non-contact fashion; and controlling said printing with a font programmable to represent said indicia to be printed on said edges of said flexible sheets;

said font being programmed to cause said portions of said indicia so determined to be printed in said spaces of said grid so identified after said position for printing of said indicia has been selected.

21. The flexible sheets having printing on corresponding edges as defined by claim 20 wherein said edges of said flexible sheets are printed with an ink jet printer having at least one print bar extending transversely of said corresponding edges of said flexible sheets in a plane generally parallel thereto.

22. The flexible sheets having printing on corresponding edges as defined by claim 20 wherein said network of evenly distributed horizontal and vertical spaces defining said grid are "em" spaces, said "em" spaces each being identified as to horizontal and vertical location by a different machine-intelligible designation.

23. The flexible sheets having printing on corresponding edges as defined by claim 21 including the step of imparting relative movement between said ink jet printer and said corresponding edges of said flexible sheets as said font causes said ink jet printer to print said portions of said indicia.

24. The flexible sheets having printing on corresponding edges as defined by claim 21 including the step of compressing said flexible sheets to cause each of said corresponding edges to be in contact with the next adjacent of said corresponding edges as said font causes said ink jet printer to print said portions of said indicia.

25. The flexible sheets having printing on corresponding edges as defined by claim 20 wherein said flexible sheets maintained in assembled relationship comprise a book, said corresponding edges of said plurality of flexible sheets comprising a fore-edge of said book.

* * * * *